United States Patent [19]

Hoppe

[11] 4,069,588
[45] Jan. 24, 1978

[54] DIGITIZER

[75] Inventor: Robert F. Hoppe, Sikeston, Mo.

[73] Assignee: Melco Industries, Inc., Denver, Colo.

[21] Appl. No.: 600,339

[22] Filed: July 30, 1975

[51] Int. Cl.² ............................................. G01B 3/00
[52] U.S. Cl. ................................. 33/1 M; 33/76 R; 340/347 AD
[58] Field of Search ......................... 33/1 M, 76 R; 340/347 AD

[56] References Cited

U.S. PATENT DOCUMENTS

| 2,785,941 | 3/1957 | Macklem et al. | 33/1 M X |
| 3,043,147 | 7/1962 | Will | 156/64 X |
| 3,184,856 | 5/1965 | Thenerkauf et al. | 33/169 R |
| 3,422,537 | 1/1969 | Dewey et al. | 33/1 M |
| 3,491,716 | 1/1970 | Ranford | 33/1 M X |
| 3,518,661 | 6/1970 | Windgate | 33/1 M X |
| 3,553,681 | 1/1971 | Cone | 33/1 M X |
| 3,624,910 | 12/1971 | Farrand | 33/1 M |

Primary Examiner—William D. Martin, Jr.
Attorney, Agent, or Firm—Sheridan, Ross, Fields & McIntosh

[57] ABSTRACT

An improvement in a digitizer for use in computer drafting has been provided wherein a multiple wire connector located in both the X beam and Y beam is held in a taut and concealed condition within the respective beams for any position of the digitizer. An adjustable attachment is provided between the extrusions for the X and Y beam and the respective X and Y guide bars so that the guide bar can be aligned in a straight condition regardless of any warping of the beams during extrusion. A mechanical brake is also provided for fixing the position of the digitizer during use.

12 Claims, 9 Drawing Figures

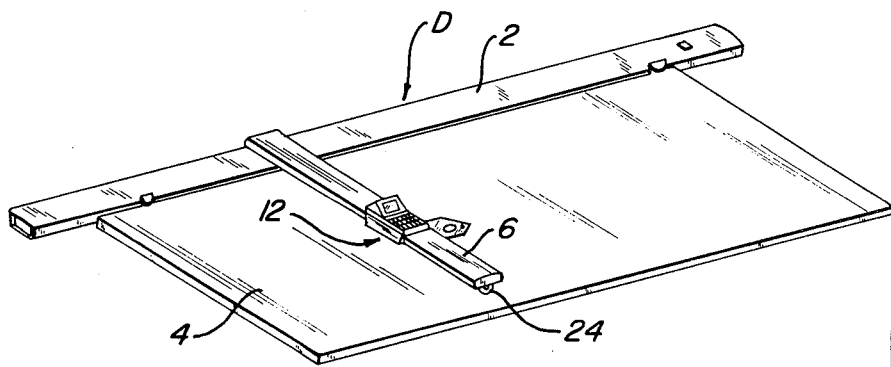
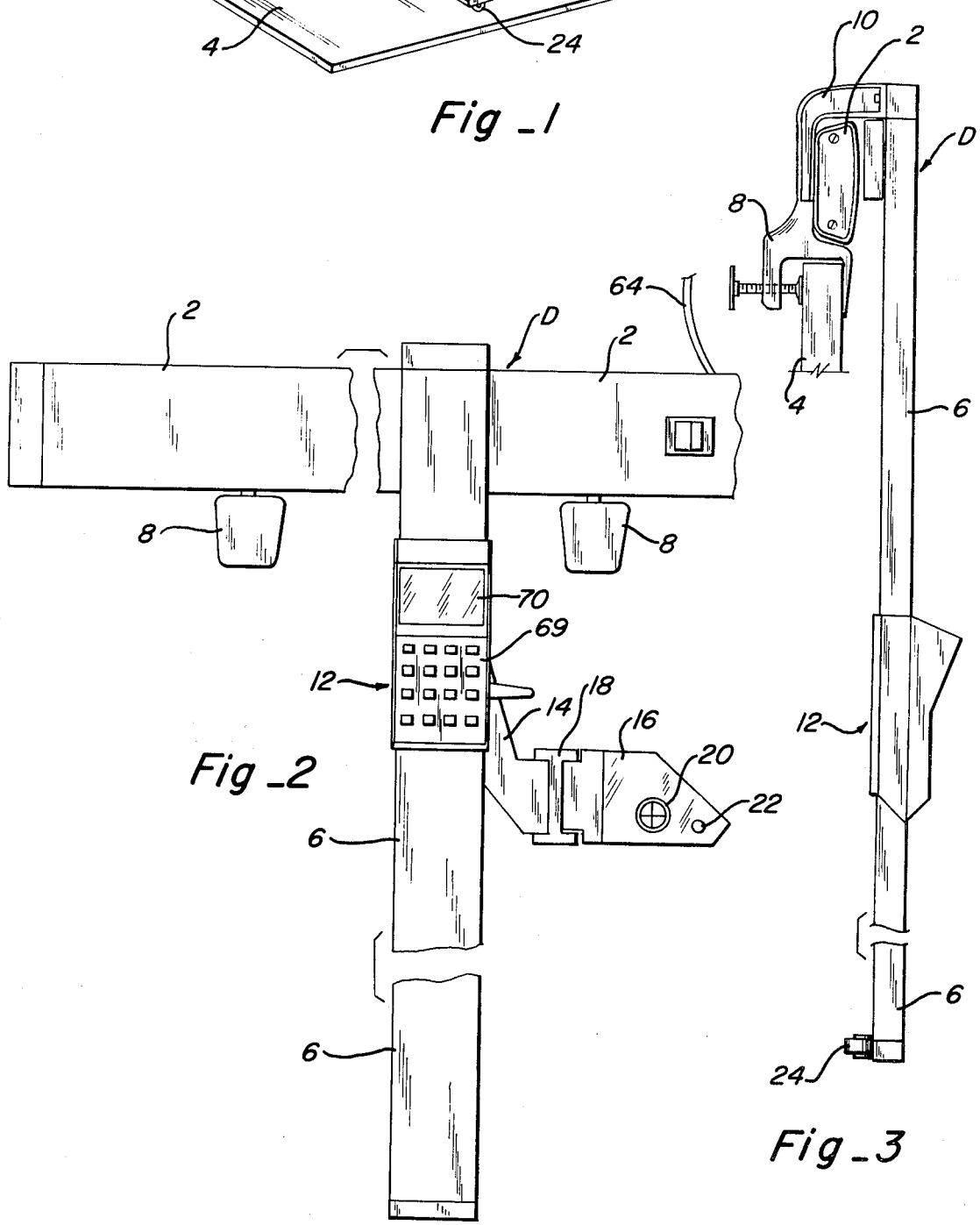
Fig _1
Fig _2
Fig _3

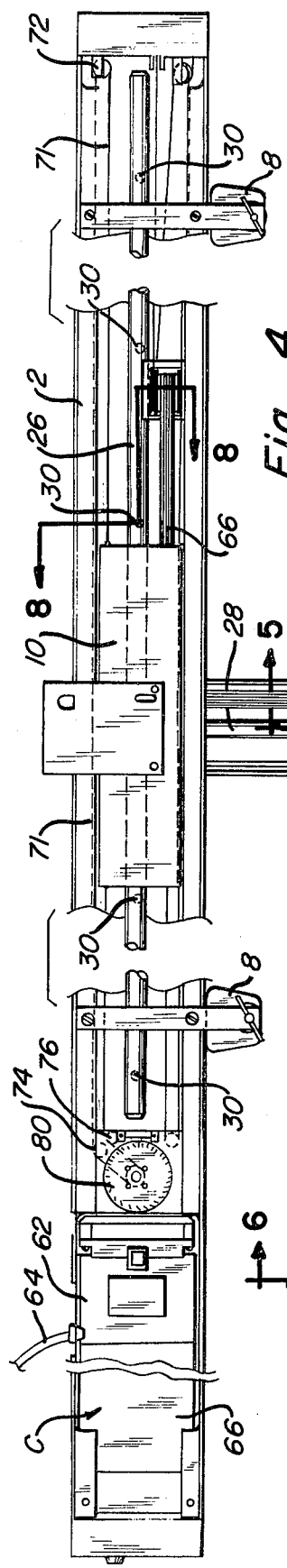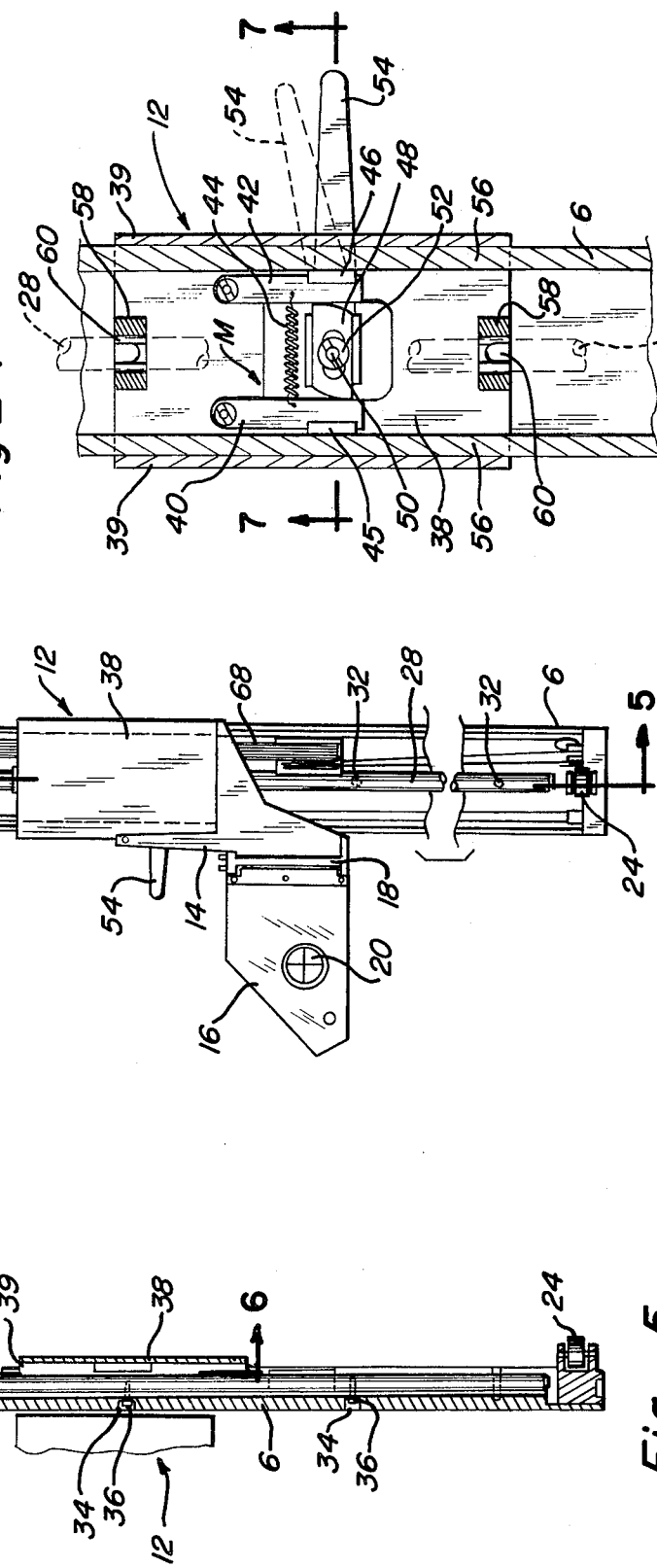

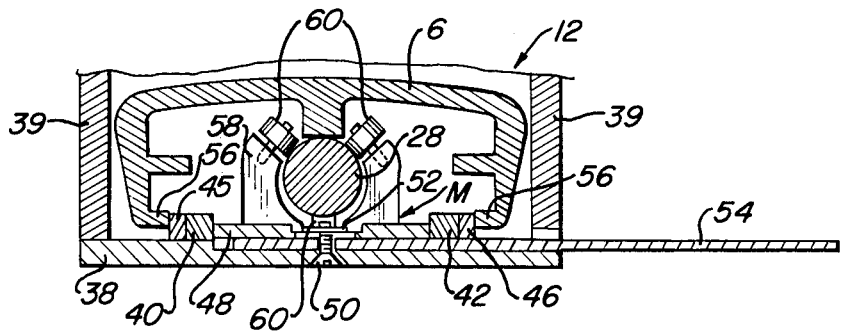
Fig_7
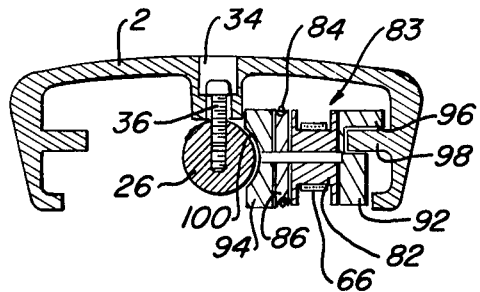
Fig_8
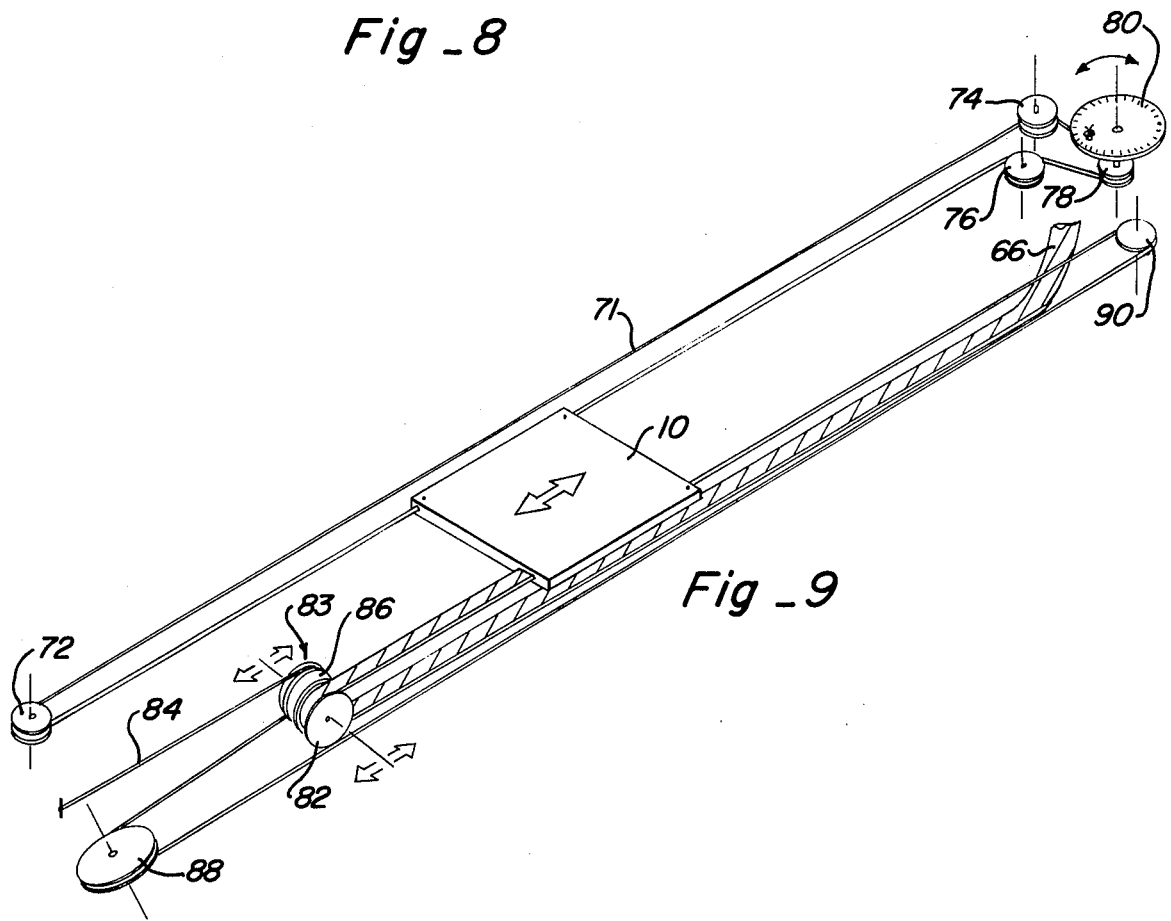
Fig_9

DIGITIZER

BACKGROUND OF THE INVENTION

1. Field of the Invention

This invention relates to an improvement in a digitizer for computer drafting and more particularly to a digitizer which is less cumbersome and less subject to error due to manufacturing variations. Furthermore, it can be moved across a drafting board to any desired position and then locked in that adjusted position.

2. Description of the Prior Art

In a conventional digitizer, a computer is provided in a fixed location on both the X beam and the Y beam and multiple wire connectors are attached thereto which extend from the computer to a readout display and keyboard. The display gives a visual indication of the position of the plotter attached to the Y beam and the position of the Y beam on the X beam. In other words, the exact point of the plotter will be visually displayed on the readout in response to a position sensing device associated with the computer. The computer is usually located at one end of each of the beams and the multiple wire connectors must be long enough to facilitate movement of the Y beam along the X beam to the opposite end of the X beam from the computer and similarly the multiple wire connectors in the Y beam must be long enough to facilitate movement of the plotter to the opposite end of the Y beam from the X beam. The problem in prior art devices is when the relative location of the beam and plotter is not at the extreme or extended position, the slack in the multiple wire connectors causes them to droop down and be both unsightly and in the way. Another difficulty is that the beams which are usually formed by extrusion are often warped in the extrusion process and the required tolerances are almost impossible to hold. Thus, the beam must be either made by more costly process or very carefully selected sections of extruded members must be made in order to find a section which is sufficiently straight to meet the required tolerances. Finally, brake means for releasably holding a plotter in adjusted position in prior art devices sometimes slip and are not as secure as required for accurate measurements.

SUMMARY OF THE INVENTION

In accordance with this invention, the improved digitizer includes a beam on which is mounted a movable carriage and a computer is located in a fixed position adjacent one end of the beam. A multiple wire connector extends from the computer past the carriage and around a movable pulley means on the side of the carriage opposite the computer and finally back to the carriage wherein information from the computer can be fed to the carriage and vice versa. The pulley means is movably mounted for movement in the same direction as the carriage and is mounted to travel the distance equal to half the distance over which the carriage moves so that the multiple wire connector is held in a taut condition at all times.

More particularly, the invention relates to a digitizer having an X beam and a Y beam wherein a computer is mounted adjacent the end of each of the beams and is connected by a multiple wire connector to a carriage movable along the respective beams, the multiple wire connector extending past the carriage and around a first pulley or sheave on a movable pulley block and back to the carriage. In this manner, the multiple wire connectors are each kept in a taut condition so that each is concealed within its beams and does not otherwise get in the way. The movable pulley block of each beam is mounted for movement therealong by means of a cord fixedly secured to the beam at one end and extending around a second pulley on the pulley block. The cord then extends around a first pulley at the end of the beam adjacent said movable pulley block and then past the carriage and around a second pulley at the end of the beam adjacent the computer. The opposite end of the cord is then connected to the side of the carriage opposite the connection to the multiple wire connector. The cord and multiple wire connector together form a closed loop system for holding the multiple wire connector taut for all positions of the carriage.

Each of the guide bars is connected to a beam by a fastening means such as a screw extending through an oversized hole in the beam into a tapped hole in the bar. The purpose of the oversized hole is to provide means to accurately align the guide bar with the beam. Since the beam is extruded, the tolerance to which the extrusion can be held are not sufficiently accurate for this type of equipment. However, the guide bars can be made within the required accuracy and with the oversized hole the guide bar can be moved until it is properly aligned and then the screw tightened down to hold it in place. If desired, a quick hardening epoxy including a metal such as powdered aluminum can be forced into the hole around the set screw to harden and minimize the chance to subsequent shifting of the guide bar with respect to the beam. Furthermore, a cam operated brake means is provided to lock the carriage on the Y beam in fixed position to position the plotter.

Additional advantages of this invention will be apparent from the description which follows, taken in conjunction with the accompanying drawings.

BRIEF DESCRIPTION OF THE DRAWINGS

FIG. 1 is a perspective view of a digitizer constructed in accordance with this invention;

FIG. 2 is a fragmentary, condensed, enlarged, top plan view of the digitizer of FIG. 1;

FIG. 3 is a condensed, side elevation of the digitizer of FIGS. 1 and 2 showing the manner in which it is connected to a drafting table;

FIG. 4 is an enlarged, fragmentary, condensed, bottom plan view of the digitizer of FIG. 2 showing further details of the internal mechanism thereof;

FIG. 5 is a longitudinal section, taken along line 5—5 of FIG. 4, showing the manner in which the Y beam is connected to the Y bar;

FIG. 6 is a longitudinal section, taken along line 6—6 of FIG. 5, showing details of the brake mechanism;

FIG. 7 is a cross section, taken along line 7—7 of FIG. 6, showing the manner in which the carriage for the plotter is mounted to move along the Y bar;

FIG. 8 is an offset cross section, taken along line 8—8 of FIG. 4, showing the movable pulley block arrangement for attaching a multiple wire connector to the carriage; and FIG. 9 is a diagrammatical perspective view showing the connection between the position sensing mechanism of the computer and the carriage and the endless loop system to keep the multiple wire connector taut at all times regardless of the position of the carriage along the beam.

DESCRIPTION OF THE PREFERRED EMBODIMENT

In accordance with this invention, an improved digitizer D is provided which has an X beam 2 mounted at the upper edge of a drafting table 4 and has a Y beam 6 movable thereacross. The X beam is attached to the drafting table by means of a series of clamp brackets, such as bracket 8, shown in FIG. 3. The Y beam 6 is slidably attached to X beam 2 by means of a carriage 10 for movement therealong in a manner which will be described more fully below. It will be understood that information is transmitted between a computer located in the X beam and an information processing station such as a digital input and display station 12 mounted thereon by means of multiple wire connectors as described below. As best seen in FIG. 2, the station 12 is mounted on a carriage 14 which has a slide or plotter 16 attached thereto as by a pivotal connection 18. Plotter 16 includes a reticle or cursor 20 to facilitate accurate positioning of the plotter at a particular position over a drawing on a drafting table 4 and also includes a handle 22 for pivoting plotter 16 about pivot connection 18 so that it is out of the way for viewing the drawing thereunder. The lower end of Y beam 6 is conveniently provided with a roller 24 to support the beam for movement across the drafting table 4.

As best seen in FIG. 4, within X beam 2 is an X bar 26 and similarly, within Y beam 6 is a Y bar 28. These bars are made very straight to very close tolerances and are each provided with a series of tapped holes 30 and 32, respectively, as best seen in FIGS. 5 and 6. The extrusion which forms Y bar 6 is provided with a series of oversized holes 34 through which fastening means, such as screws 36, extend into the tapped holes in Y bar 28. Since the bars are flexible but the extrusions are not, the guide bars after assembly can be aligned in a straight condition on the beams by loosening the screws slightly and adjusting the position of the guide bar and then tightening the screw back down. This can be done successively along the bar and extrusion until the guide bar is perfectly straight so movement of the respective carriages therealong will follow the desired straight line path.

Digital input and display station 12 includes a bottom plate 38, as best seen in FIGS. 4–7 which together with depending side flanges 39 encircles Y beam 6 and Y bar 28 as best seen in FIG. 7. A brake means M is provided therein for adjustably locking carriage 14 in any selected adjusted position along Y beams 6. As seen in FIG. 6, the brake includes arms 40 and 42 which are pivotally mounted on plate 38, as shown and biased toward each other by connecting spring 44. Each arm is provided with a brake shoe 45 and 46, respectively. A cam 48 is mounted for pivotal movement about a screw 50 which extends through plate 38 and into a threaded washer 52. The cam 48 is fixedly secured to a lever arm 54 which can be manipulated to urge brake shoe 45 and 46 against the inturned lips 56 of Y beam 6, as shown in FIGS. 6 and 7.

Mounted on each end of plate 38 are brackets 58 which have three rollers 60 equally spaced therearound and in engagement with Y bar 29 for sliding movement therealong. Thus, carriage 14 and its associated parts can be moved along Y beam 6 to any selected position when brake shoes 45 and 46 are disengaged from inturned lips 56. When the desired position is reached, lever 54 can be moved to bring the brake shoes into locking engagement.

A computer C, as seen in FIG. 4, is located at one end of X beam 2 and includes a transformer 62, supplied with power from an electrical connection 64, and further includes printed circuit boards 66, as shown A suitable computer is the Fairchild PPS-25 Microprocessor System, manufactured by the Fairchild Semiconductor Division of Fairchild Camera and Instrument Corporation, at 313 Fairchild Drive, Mountain View, California. Information is supplied to and from the computer through multiple wire connectors such an eight wire connector 66, shown in FIGS. 4 and 9, which extends from the computer to an electrical connection in carriage 10. A second multiple wire connector, such as a five wire multiple wire connector 68, extends from an information processing station, such as a printed circuit board, not shown, in carriage 10 along Y beam 6 and connects to carraige 38. Conveniently, input signals may be supplied by means of keyboard 69. These signals are then transmitted by certain of the wires of the five wire connector through the circuit board in carriage 10 which amplifies the signal and transmits it through certain of the wires of the eight wire connector to computer C for processing. The computer can then make appropriate caluclations which are furnished through other of the wires of the eight and five wire connectors to a digital display 70 on station 12.

It will be understood that the means for holding the multiple wire connectors in both the X beam and the Y beam in taut condition is the same. Similarly, the means for sensing the position of the respective carriages is identical in both beams. However, for simplicity of explanation only the X beam mechanism will be described.

By reference to FIGS. 4 and 9, it can be seen that a cord 71 is provided that has opposite ends connected to opposite sides of carriage 10 to form an endless loop and this loop extends around a fixed pulley 72 at one end of the beam and around guide pulleys 74 and 76 at the other end of the beam which direct the cord around a pulley 78 on an optical position-sensing device 80. This optical position-sensing device can be in the form of a disc having a plurality of lines spaced therearound which interrupt a photo sensor to provide a signal indicative of the position of carriage 10 along the X beam. Thus, when carriage 10 moves back and forth along beam 2, disc 80 will be turned in response thereto and provide a signal indicative of the amount of movement of the carriage. This signal will be transmitted by the previously described multiple wire connectors to the computer.

Eight wire connector 66 extends from computer C past the carriage and around one sheave 82 of a double sheave pulley block 83 and back to the carriage 10 where the other end is connected. A cord 84 extends around the other sheave 86 of the movable pulley block and has one end fixedly connected to the beam. After passing around pulley 86 the cord extends around an angularly mounted pulley 88 and then past the carriage and around a fixed pulley 90 mounted at the opposite end and back to the carriage where it is connected. It can be seen that by this arrangement, a closed loop system is provided wherein pulley block 83 with sheaves 82 and 86 moves a distance equal to one half the distance moved by carriage 10 and in the direction as the carriage which will always maintain multiple wire connectors 66 in a taut condition. Conveniently, as best seen in FIG. 8, the pulley block includes guide members 92 and 94, wherein guide member 92 has a recess 96 into which a flange 98 along the side of beam 6 extends. Guide member 92 is provided with a curved recess 100 which corresponds to the curvature of X bar 26. Thus, the guide bar 26 and flange 96 provide a track or guide means for pulley block 83 to move along.

As previously stated, the closed loop mechanism for five wire connector 68 in X beam 6 works in identical manner for keeping the connector taut between carriage 14 and its connection at its other end of the X beam in carriage 10.

From the foregoing, the advantages of this invention are readily apparent. A digitizer has been provided wherein multi wire connectors can be held in taut condition and concealed in the X beam and Y beam where they are out of the way. Furthermore, a novel means of aligning the X and Y bars on the X and Y beams, since the bars can be manufactured to closer tolerances than the beams is provided by adjustment means such as a set screw and oversized hole. Also, a novel brake arrangement is provided to positively lock carriage 14 and plotter 16 in any desired adjusted position.

The invention has been described in detail with particular reference to a preferred embodiment thereof, but it will be understood that variations and modifications can be effected within the spirit and scope of the invention.

What is claimed is:

1. An improvement in a digitizer for holding a multiple wire connector in taut condition between stationary computer and a movable carriage in a digitizer which includes a beam, a carriage movable along said beam, a computer attached to one end of said beam, said improvement comprising:
   a multiple wire connector for transmitting information from said carriage and having one end connected to said carriage and the other end connected to said computer;
   a pulley means movable along said beam in response to said movement of said carriage, said multiple wire connector extending from said carriage around said pulley means back past said carriage to said computer; and
   means for moving said pulley means in the same direction as said carriage but only half the distance of the movement of said carriage to hold said multiple wire connector in taut condition during any movement of said carriage along said beam.

2. The improvement, as claimed in claim 1, wherein said pulley moving means comprises:
   a pulley block having a first pulley and a second pulley rotatably mounted therein, said multiple wire connector extending around said first pulley;
   means for guiding said pulley block along said beam;
   a cord fixedly attached to said beam at a first end adjacent said pulley block and extending around said second pulley and then around a reversing pulley adjacent said first end of said beam and past said carriage to a return pulley at the opposite end of said beam, the other end of said cord being attached to said carriage on the side thereof opposite the connection of said multiple wire connector to said carriage.

3. The improvement, as claimed in claim 2, wherein said first reversing pulley is mounted on an oblique axis with respect to said other pulleys.

4. The improvement, as claimed in claim 1, further including:
   an endless loop for sensing the position of said carriage along said beam, said endless loop comprising:
   a cord having one end connected to one side of said carriage and extending around a reversing pulley at one end of said beam and back past said carriage to a first guide pulley mounted adjacent the other end of said beam and around means for moving a position sensing means and then around a second guide pulley adjacent said first guide pulley, said second end of said cord being connected to said carriage on a side opposite the connection to the first end of said cord.

5. The improvement, as claimed in claim 1, further including:
   a bar extending along said beam and being manufactured to closer tolerances than said beam;
   a plurality of fastening means spaced along said beam for connecting said beam to said bar;
   oversized holes in said beam through which said fastening means extends to provide adjustment of said bar with respect to said beam so that said bar can be aligned on said beam and said fastening means tightened to hold said bar in alignment; and
   a self-hardening material interjected into said oversized holes after alignment of said beam with said bar to hold said bar more securely in alignment on said beam.

6. The improvement, as claimed in claim 1, further including: brake means on said carriage comprising:
   a pair of arms pivoted to said carriage and having brake shoes thereon for engagement with said beam;
   resilient means biasing said arms toward each other;
   cam means movable to urge said arms outwardly against the force of said resilient means to bring said brake shoes into engagement with said beam to lock said carriage to said beam.

7. The improvement, as claimed in claim 6, wherein said brake means further includes:
   a lever operatively connected to said cam means for pivoting said cam means from an inoperative position wherein said resilient means biases said arms inwardly and an operative position wherein said arms are forced outwardly against the force of said resilient means so that the brake shoes engage the sides of said beam.

8. The improvement, as claimed in claim 5, further including:
   roller means mounted on said carriage engageable with said bar for moving said carriage along said beam.

9. The improvement, as claimed in claim 8, wherein said roller means further includes:
   a pair of spaced brackets on said carriage, each of said brackets substantially encircling said bar; and
   a plurality of rollers spaced around each of said brackets and engageable with said bar for rolling contact therewith.

10. An improvement in a digitizer for holding a multiple wire connector in taut condition between a stationary computer and a movable carriage in a digitizer which includes an X beam, a first carriage movable along said X beam, a Y beam having one end connected to said first carriage and depending therefrom, a second carriage movable along said Y beam, a computer mounted adjacent one end of said X beam, a digital display and keyboard on said second carriage, said improvement comprising:

- a first pulley means movable along said X beam in response to said movement of said first carriage and mounted on the opposite side of said first carriage from said computer;
- a first multiple wire connector extending from said computer past said first carriage around said first pulley means and back to said first carriage;
- means for moving said first pulley means in the same direction as said first carriage but only half the distance of the movement of said first carriage to hold said first multiple wire connector in taut condition during movement of said first carriage along said X beam;
- a second pulley means movable along said Y beam in response to said movement of said second carriage and mounted on the opposite side of said second carriage from sid first carriage;
- a second multiple wire connector extending from said first carriage past said second carriage around said second pulley means and back to said second carriage, said first and second multiple wire connectors being electrically interconnected through said first carriage; and
- means for moving said second pulley means in the same direction as said first carriage but only half the distance of the movement of said second carriage to hold said second multiple wire connector in taut condition during movement of said second carriage along said Y beam.

11. The improvement, as claimed in claim 10, wherein said first pulley means comprises:

- a first pulley block having a first pulley and a second pulley rotatably mounted therein, said first multiple wire connector extending around said first pulley;
- means for guiding said first pulley block along said X beam;
- a reversing pulley adjacent the other end of said X beam;
- a return pulley adjacent said one end of said X beam;
- a cord fixedly attached to said X beam at said other end and extending around said second pulley and then around said reversing pulley and past said first carriage to said return pulley, the other end of said cord being attached to said first carriage on the side thereof opposite the connection of said first multiple wire connector to said first carriage; and wherein said second pulley means comprises:
- a second pulley block having a first pulley and a second pulley rotatably mounted therein, and second multiple wire connector extending around said first pulley;
- means for guiding said second pulley block along said Y beam;
- a reversing pulley adjacent the other end of said Y beam;
- a return pulley adjacent said one end of said Y beam; and
- a cord fixedly attached to said Y beam at said other end and extending around said second pulley and then around said reversing pulley and said second carriage to said return pulley, the other end of said cord being attached to said second carriage on the side thereof opposite the connection of said second multiple wire connector to said second carriage.

12. The improvement, as claimed in claim 11, further including:

- a first position sensing means in said X beam for sensing the position of said first carriage and said Y beam along said X beam, said first position sensing means including:
  - a rotatable photosensor activation device to provide an output signal to said computer responsive to the angular position of said device; and
  - a cord having its end connected to opposite sides of said first carriage and extending around guide means at opposite ends of said X beam and around said device to form an endless loop for changing the angular position of said device in response to any change in position of said first carriage along said X beam;
- and a second position sensing means in said Y beam for sensing the position of said second carriage along said Y beam, said second position sensing means including:
  - a rotatable photosensor activation device to provide an output signal to said computer responsive to the angular position of said device; and
  - a cord having its ends connected to opposite sides of said second carriage and extending around guide means at opposite ends of said Y beam and around said device to form an endless loop for changing the angular position of said device in response to any change in position of said second carriage along said Y beam.

* * * * *